US010880977B1

(12) United States Patent
Cavacuiti et al.

(10) Patent No.: US 10,880,977 B1
(45) Date of Patent: Dec. 29, 2020

(54) RAPID COMMISSIONING OF LIGHTING DEVICES

(71) Applicant: Panasonic Intellectual Property Management Co., Ltd., Osaka (JP)

(72) Inventors: John Cavacuiti, Burnaby (CA); Masaaki Ikehara, Burnaby (CA)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/831,745

(22) Filed: Mar. 26, 2020

(51) Int. Cl.
*H05B 47/19* (2020.01)
*H04M 1/72* (2006.01)
*H04W 4/70* (2018.01)
*H04M 1/725* (2006.01)

(52) U.S. Cl.
CPC ........ *H05B 47/19* (2020.01); *H04M 1/72533* (2013.01); *H04W 4/70* (2018.02)

(58) Field of Classification Search
None
See application file for complete search history.

(56) References Cited

U.S. PATENT DOCUMENTS

2015/0115805 A1*  4/2015  Henig ............... H05B 47/105
                                                          315/152

* cited by examiner

*Primary Examiner* — Dedei K Hammond
(74) *Attorney, Agent, or Firm* — Renner, Otto, Boisselle & Sklar, LLP

(57) ABSTRACT

A technique for commissioning of a light source includes transmitting outgoing beacon signals, each outgoing beacon signal including a stored light source identifier that uniquely identifies the light source; receiving incoming beacon signals including an incoming beacon signal carrying an incoming light source identifier that corresponds to the stored light source identifier; receiving subsequent incoming beacon signal carrying the incoming light source identifier; and changing commissioning information in response to receiving the subsequent incoming beacon signal carrying the incoming light source identifier.

16 Claims, 6 Drawing Sheets

RAPID COMMISSIONING OF LIGHTING DEVICES

BACKGROUND

Commissioning is a quality assurance process that ensures installed building systems perform interactively and continuously according to the owner's needs and the design intent. Commissioning answers the question, "Does the building and its systems perform according to what the owner wanted and the designer intended?" Therefore, the commissioning process begins with identifying the owner's project requirements and ends with ensuring the design intent, finished design, and installed systems satisfy these requirements. The benefits of commissioning include reduced energy and operating costs, enhanced property value and marketability, verification the building and its systems will perform as intended, and greater user acceptance and satisfaction.

The American Society of Heating, Refrigerating and Air-Conditioning Engineers (ASHRAE)'s Guideline 0-2005, The Commissioning Process, defines a process for commissioning whole buildings. In 2011, the Illuminating Engineering Society (IES) developed Design Guide 29, The Commissioning Process Applied to Lighting and Control Systems, which serves as a lighting-specific guide to The Commissioning Process described in Guideline 0.

In the lighting industry, the term "commissioning" is often applied to lighting control system activation or initial set up, in which a manufacturer's representative sets up and calibrates installed controls as a service. Commissioning may apply to an entire building and its energy-using systems, including lighting and controls. System activation and functional testing are steps within a larger process of ensuring all installed systems satisfy the design intent and owner's requirements.

In the example of a large building, warehouse, or retail store, the commissioning process may include assigning individual lighting devices including light sources to lighting groups, for the devices to be controlled or monitored differently depending on their assigned lighting group.

Conventionally, the commissioning process has been time-consuming in terms of worker hours and, therefore, has been slow and expensive.

BRIEF SUMMARY OF THE INVENTION

The present disclosure discloses techniques that use beacon signals, not dedicated networks or connections, to achieve lighting systems' commissioning. The techniques disclosed herein may change commissioning information stored in the lighting devices in response to receiving particular combinations of beacon signals.

These novel techniques result in rapid commissioning of light sources, particularly as compared to other processes. Time required for commissioning of relatively large, commercial or industrial settings (which may include hundreds or thousands of light sources) using the techniques disclosed herein may be reduced significantly from the days or even weeks needed for other processes. This may mean significant time and cost savings.

These and other advantages of the invention will become apparent when viewed in light of the accompanying drawings, examples, and detailed description.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
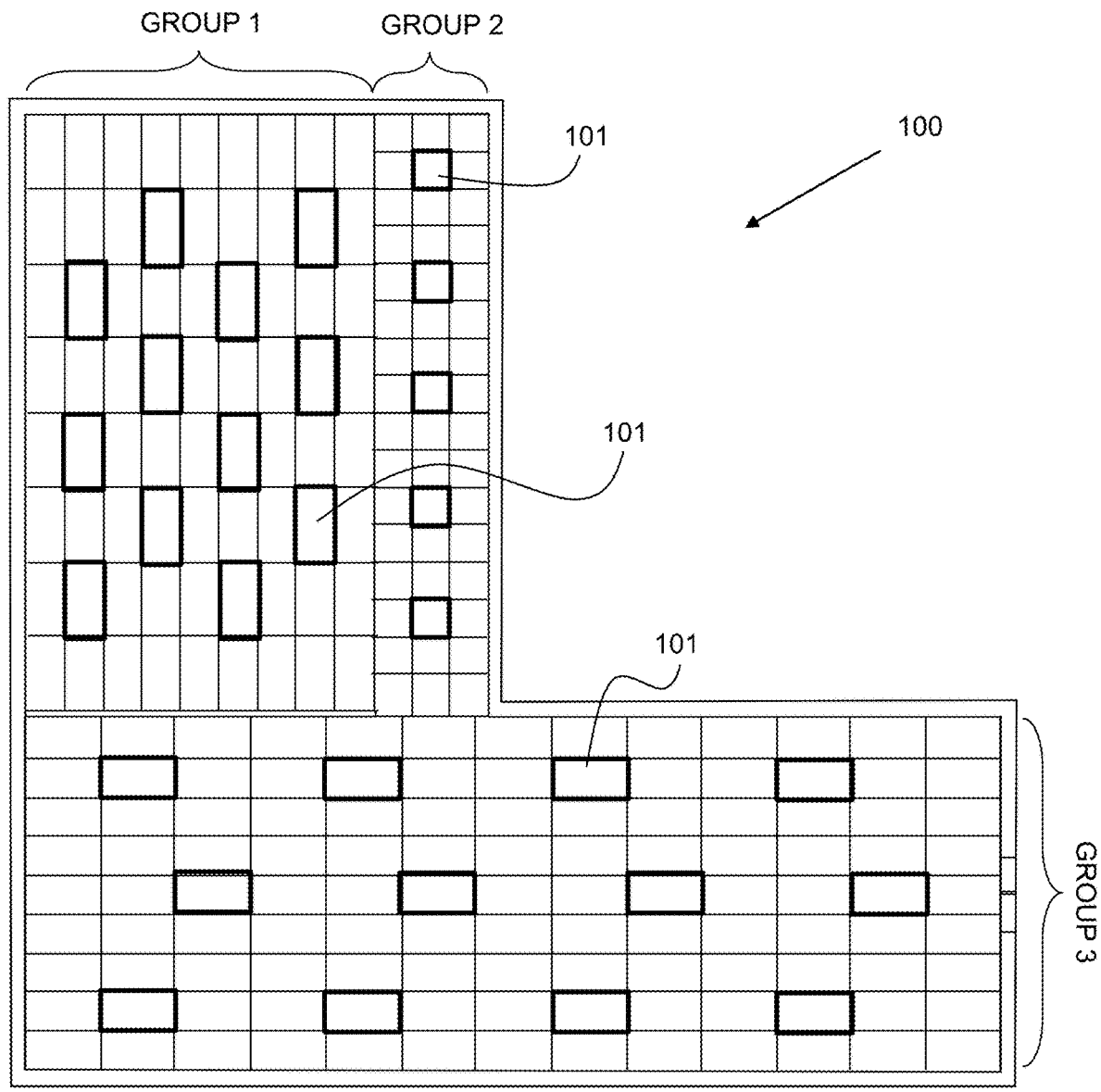
FIG. 1 illustrates a schematic diagram of an exemplary space that may correspond to a warehouse or large retail space with light sources.

FIG. 1 illustrates a schematic diagram of an exemplary space 100 that may correspond to a warehouse or large retail space. The space 100 employs a number of light sources 101 (e.g., light fixtures, etc.) to provide lighting. Different areas within the space 100, however, may have different lighting requirements. As such, the light sources 101 may be divided into lighting groups. FIG. 1 illustrates three lighting groups: GROUP 1, GROUP 2, and GROUP 3. Light sources in a group may be controlled differently from light sources in another group. For example, the light sources 101 in GROUP 1 may be controlled to have a different intensity of light from the intensity of light sources 101 in GROUP 2. In another example, the light sources 101 in GROUP 1 may be controlled to have a different light color temperature from the color temperature of light sources 101 in GROUP 3. In yet another example, the light sources 101 in GROUP 2 may be controlled to remain on at all times while the light sources 101 in GROUP 3 may be turn on and off based on the time of day.

The commissioning process may include assigning the individual light sources 101 to their respective group. During an initial set up (prior to regular use) a manufacturer's representative or other technician may set up or program commissioning information into the light sources 101 including, for example, the respective lighting group.

Figure 2:
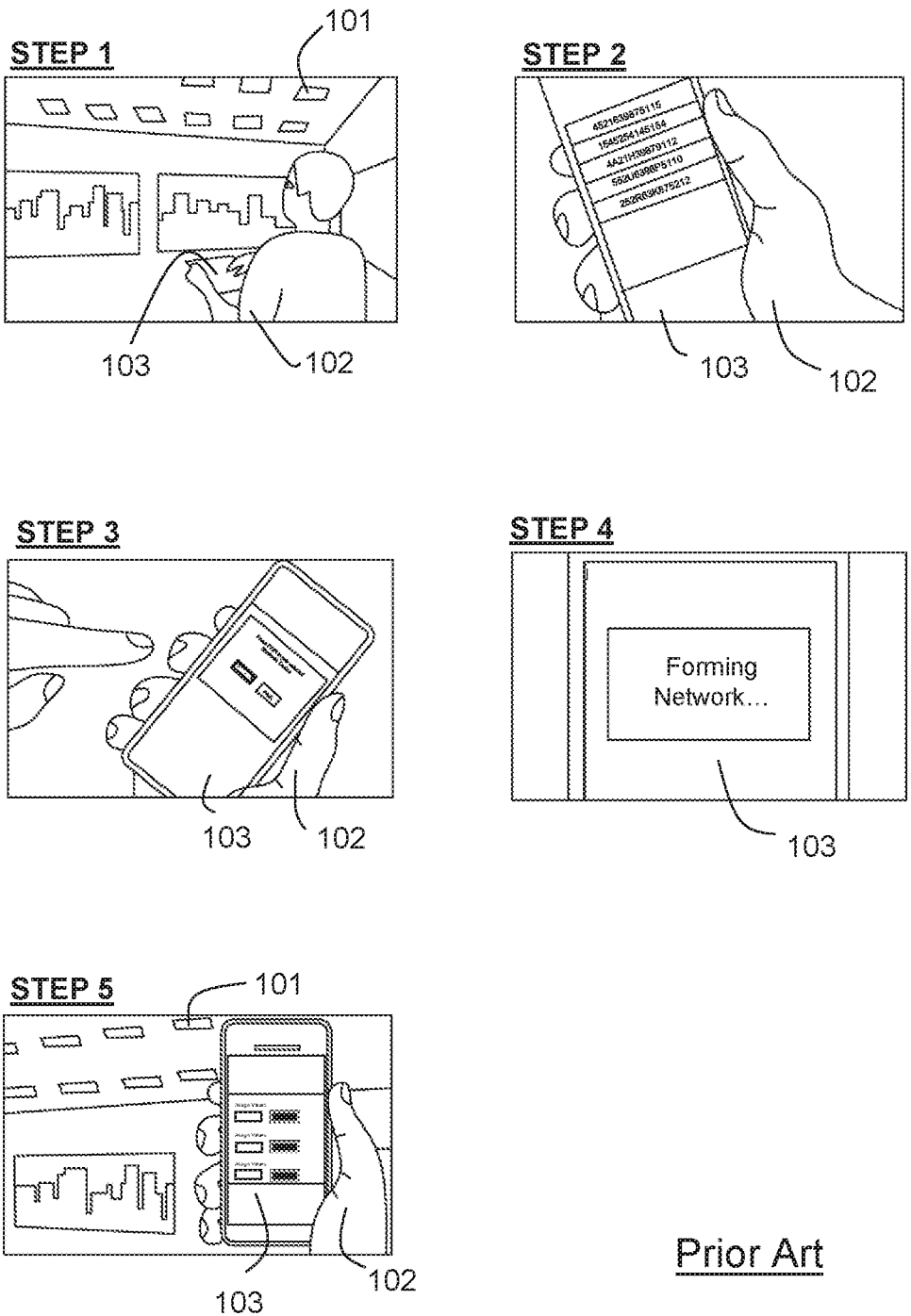
FIG. 2 illustrates a schematic diagram of an exemplary commissioning process.

FIG. 2 illustrates a schematic diagram of an exemplary commissioning process. At Step 1, a manufacturer's representative or other technician (user 102) may walk the space 100 carrying a mobile device 103 such as a tablet or smartphone.

Light sources 101 (or their controlling device) may each be capable of establishing a network with the mobile device 103 using a known wireless technology standard or protocol (e.g., Bluetooth®, Wi-Fi®, etc.). Each light source 101 (or their controlling device) may constantly transmit advertising data payloads to let the mobile device 103 know that it exists (e.g., Generic Access Profile (GAP)). At step 2, the mobile device 103 may display a list of light sources 101 detected.

At Step 3, the user 102 may select a light source 101 to be commissioned from those listed by the mobile device 103. At Step 4, upon selection by the user 102, a network may be formed between the mobile device 103 and the selected light source 101 or its controlling device using the known wireless technology standard or protocol (e.g., Generic Attribute Profile (GATT)). A network key may be necessary to establish the network connection. The connected light source 101 may flash to confirm the network connection.

Once a network has been established, commissioning information may be transmitted by the mobile device 103 via the network. Commissioning information may be pre-programmed for the mobile device 103 to transmit to the light source 101 or its controlling device. At step 5, the user 102 may use the mobile device 103 to adjust or fine-tune settings for the light source 101 currently networked with the mobile device. Once a light source 101 has been commissioned, the user 102 may disconnect the mobile device 103 from the formed network and repeat the process for every other light source in the space 100.

The process of FIG. 2 is time-consuming. In some cases, commissioning of a single light source can take up to two minutes. Commissioning of relatively large, commercial or industrial settings (which may include hundreds or thousands of light sources) using this process may take days or even weeks. This is costly. A significant portion of the time is spent establishing the network between the mobile device 103 and the light source 101 or its controlling device.

Figure 3:
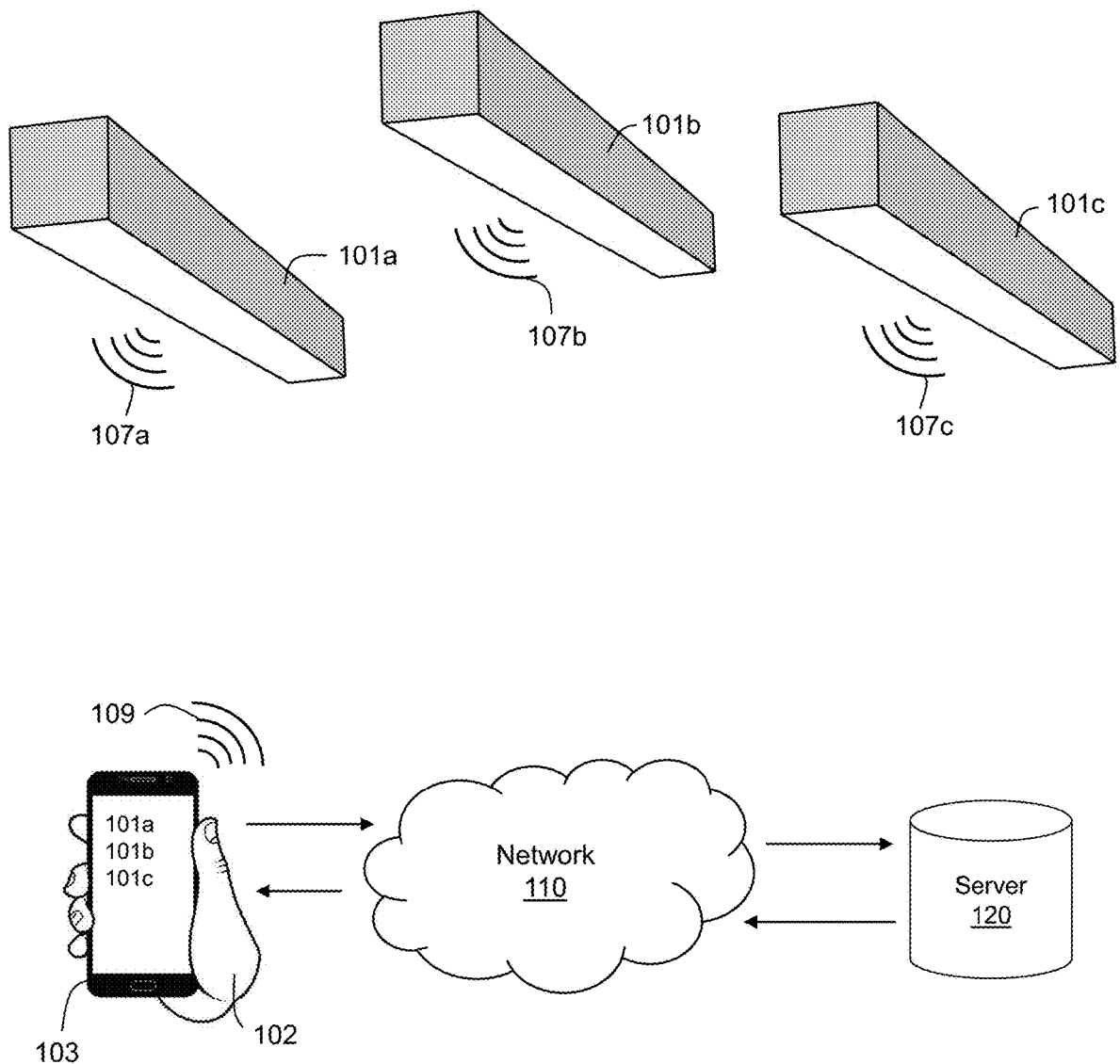
FIG. 3 illustrates a schematic diagram of an exemplary lighting device commissioning system.

FIG. 3 illustrates a schematic diagram of a commissioning system. The system may include one or more lighting devices or light sources 101a-c capable of storing identifying and commissioning information and capable of communicating (receive and transmit) beacon signals. For purposes of simplicity of explanation this disclosure refers to the devices 101 as light sources. However, the devices 101 may include lighting devices in general that may need commissioning such as dimmers, sensors, controllers, etc.

The light sources 101a-c may store the identifying and commissioning information and may communicate (receive and transmit) beacon signals, the light sources 101a-c may be connected to controlling devices that may store the identifying and commissioning information and communicate (receive and transmit) the beacon signals, or combinations thereof. The system may also include a mobile device 103 having installed thereon a commissioning program or application and capable of communicating (receive and transmit) beacon signals. The mobile device 103 may also be able to communicate through a network 110 to a remote server 120 that may have stored therein commissioning information. Via the network 110, the device 103 may receive the commissioning information from the server 120.

Beacon signals are low energy signals that transmitting devices may broadcast (often continuously and indiscriminately) and that receiving devices such as smartphones may scan for and receive. Examples of beacon signals include iBeacon®, Eddystone®, Bluetooth® low energy (BLE) signals, etc. A common feature of beacon signals is that they contain a unique ID number. As explained below, in some embodiments, the techniques disclosed herein use the unique ID number as a light source identifier. In other embodiments, however, the light source identifier may be part of portion or packet in the beacon signal other than the unique ID number. In some embodiments, the light source identifier may be a MAC address.

The light sources 101a-c may transmit outgoing beacon signals 107a-c carrying respective light source identifiers that uniquely identify the light sources 101a-c as well other information such as device type (e.g., fixture, sensor, dimmer, etc.) The mobile device 103 may scan for beacon signals and display a listing or mapping of light sources whose outgoing beacon signals 107a-c the mobile device 103 received. The listing or mapping may include the device type. A user may select a light source from the listing or mapping of light sources to commission. For example, the user may select the light source 101a from the listing or mapping on the mobile device 103.

The mobile device 103, as a result of the user selection, may transmit an incoming beacon signal 109 carrying the light source identifier received from the selected light source 101a. All light sources 101a-c within range may receive the incoming beacon signal 109. However, all but the selected light source may disregard the incoming beacon signal 109 since it does not carry their light source identifier. The selected light source 101a, on the other hand, may process the incoming beacon signal 109. In one embodiment, the selected light source 101a may flash (i.e., turn on and off or vice versa) to give feedback to the user that it is the selected light source from the listing or mapping on the mobile device 103.

In one embodiment, subsequent user selection of the light source 101a from the listing or mapping of light sources on the device 103 and, therefore, transmission by the mobile device 103 and receipt by the light source 101a of a subsequent incoming beacon signal carrying the light source 101a light source identifier, may cause the light source 101a to update the commissioning information including, for example, the value for the lighting group assigned to the light source 101a. Further subsequent user selection of the light source 101a from the listing or mapping of light sources on the device 103 may cause the light source 101a to further update the commissioning information including, for example, the value for the lighting group assigned to the light source 101a.

Figure 4:
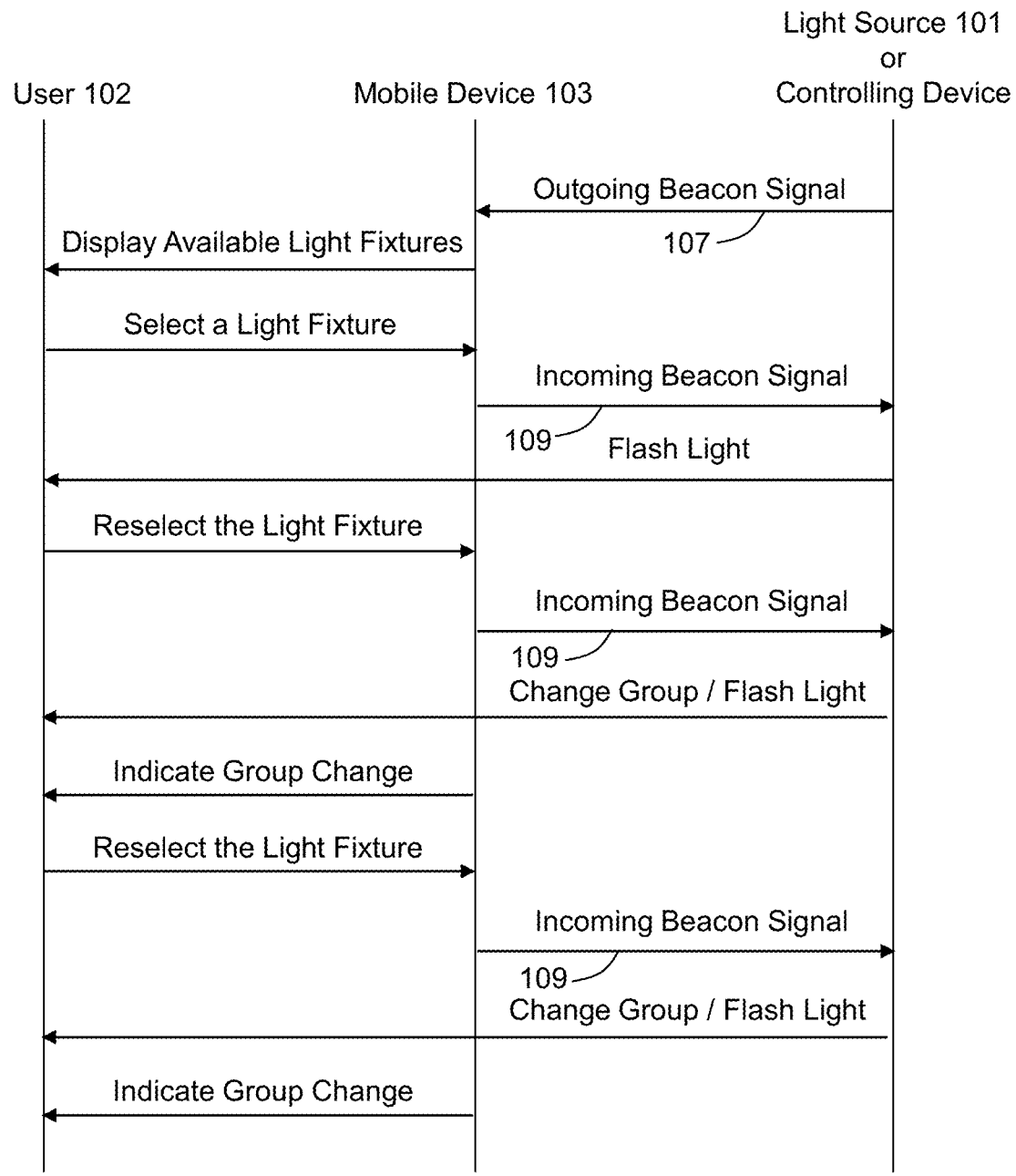
FIG. 4 illustrates a schematic diagram of an exemplary light source commissioning process for the system of FIG. 3.

FIG. 4 illustrates a schematic diagram of an exemplary light source commissioning process for the system of FIG. 3. Light sources 101 in the space 100 (or their respective controlling devices) may transmit outgoing beacon signals 107. Each outgoing beacon signal may include a stored light source identifier that uniquely identifies the respective light source 101. The mobile device 103 receives outgoing beacon signals corresponding to all light sources 101 within range. The mobile device 103 extracts the stored light source identifiers from the received outgoing beacon signals to identify the light sources 101 and displays a listing or mapping of the light sources 101 within range.

In the case where the mobile device 103 provides a listing, the mobile device 103 may use Received Signal Strength Indicator (RSSI) to narrow down the number of sources 101 listed (e.g., sources 101 closer to the mobile device 103 may be listed while sources 101 farther away from the device 103 are not) or to order the sources 101 listed (e.g., sources 101 closer to the mobile device 103 may be listed atop the list while sources 101 farther away from the mobile device 103 may be listed at the bottom) based on signal strength.

The user 102 may select from the list or mapping the light source 101 to be commissioned. The mobile device 103 may then transmit an incoming beacon signal 109 carrying the light source identifier of the selected light source 101. The light sources 101 within range receive the incoming beacon signal 109. The light source 101 whose light source identifier the beacon signal 109 carries may recognize its light source identifier and flash one or more of its light sources (e.g., LED) to give feedback to the user 102 that the incoming beacon signal has been received.

At this point, the user 102 may reselect from the list or mapping the light source 101 to be commissioned. The mobile device 103 may then transmit an incoming beacon signal 109 carrying the light source identifier of the selected light source 101. The light sources 101 within range receive the incoming beacon signal 109. The light source 101 whose light source identifier the beacon signal 109 carries may recognize its light source identifier and change commissioning information which may include increasing a value for the lighting group assigned to the light source 101. In one example, if the lighting group assigned to the light source 101 was previously GROUP 1, receiving the subsequent incoming beacon signal may cause the light source 101 to increase the value of the lighting group assigned to the light source 101 to GROUP 2.

The light source 101 whose light source identifier the beacon signal 109 carries may, upon recognizing its light source identifier, flash one or more of its light sources (e.g., LED) to give feedback to the user 102.

In one embodiment, the mobile device 103 records or indicates that the commissioning information (e.g., lighting group) of the selected light source 101 has been changed (e.g., to GROUP 2). In one embodiment, the mobile device 103 interprets the user 102 reselection of the mobile device 103 as a change in the commissioning information and records it or indicates it as such. In another embodiment, the user 102 may indicate the change in the commissioning information by making a selection in the mobile device 103.

If the commissioning information (e.g., lighting group) of the light source 101 is now as planned or desired, the process ends and the user 102 may move on to commission the next light source. However, if the desired commissioning information (e.g., lighting group) is not yet as planned or desired, the process may continue. The user 102 may reselect from the list or mapping the light source 101 being commissioned. The mobile device 103 may then transmit an incoming beacon signal 109 carrying the light source identifier of the selected light source 101. The light sources 101 within range receive the incoming beacon signal 109. The light source 101 whose light source identifier the beacon signal carries may recognize its light source identifier and change commissioning information which may include increasing a value for the lighting group assigned to the light source 101. If the lighting group assigned to the light source 101 was previously GROUP 2, receiving the subsequent incoming beacon signal may cause the light source 101 to increase the value of the lighting group assigned to the light source 101 to GROUP 3.

The light source 101 whose light source identifier the beacon signal 109 carries may, upon recognizing its light source identifier, flash one or more of its light sources (e.g., LED) to give feedback to the user 102. In one embodiment, the light source 101 may flash one or more of its light sources (e.g., LED) a number of times corresponding to the number in the lighting group currently assigned to the lighting device 101 (e.g., one blink=GROUP 1, two blinks=GROUP 2, etc.)

Thus, in this embodiment, changing the commissioning information including changing the value of the lighting group assigned to a light source 101 includes increasing the value of the lighting group assigned to the light source 101 one unit for every instance the incoming light source identifier received in the subsequent incoming beacon signal corresponds to the stored light source identifier.

In one embodiment, the mobile device 103 records or indicates that the commissioning information (e.g., lighting group) of the selected light source 101 has been changed (e.g., to GROUP 3). In one embodiment, the mobile device 103 interprets the user 102 reselection of the mobile device 103 as a change in the commissioning information and records it or indicates it as such. In another embodiment, the user 102 may indicate the change in the commissioning information by making a selection in the mobile device 103.

The process of FIG. 4 is fast, particularly as compared to the process of FIG. 2. In one embodiment, commissioning of a single light source using the process of FIG. 4 may take 10-20 seconds. Time required for commissioning of relatively large, commercial or industrial settings (which may include hundreds or thousands of light sources) using this process of FIG. 4 may be reduced significantly from the days or even weeks needed for the process of FIG. 2. This may mean significant time and cost savings. A significant portion of the process of FIG. 2 is spent establishing the network between the mobile device 103 and the light source 101 or its controlling device. The process of FIG. 4 does not need to establish a network and is, thus, much faster.

In one embodiment, prior to installation of the light source 101, perhaps during manufacturing, default commissioning information including a default value for the lighting group (e.g., GROUP 1) may be assigned to the light source 101 by, for example, storing it in memory. Assuming that most lighting installations would have a GROUP 1, storing of default commissioning information including GROUP 1 as the default value for the lighting group, may help save additional commissioning time. In one embodiment, during the same pre-installation process the light source identifier that uniquely identifies the light source may also be stored in memory.

In one embodiment, once the commissioning process has been completed, a dedicated connection or network may be established with the light sources 101 or their controlling devices. Via the dedicated connection or network, the light sources 101 may receive instructions to prevent subsequent incoming beacon signals from changing the commissioning information including the value of the lighting group assigned to the light sources 101. This way, the commissioning information may be protected from tampering or accidental change.

Figure 5A:
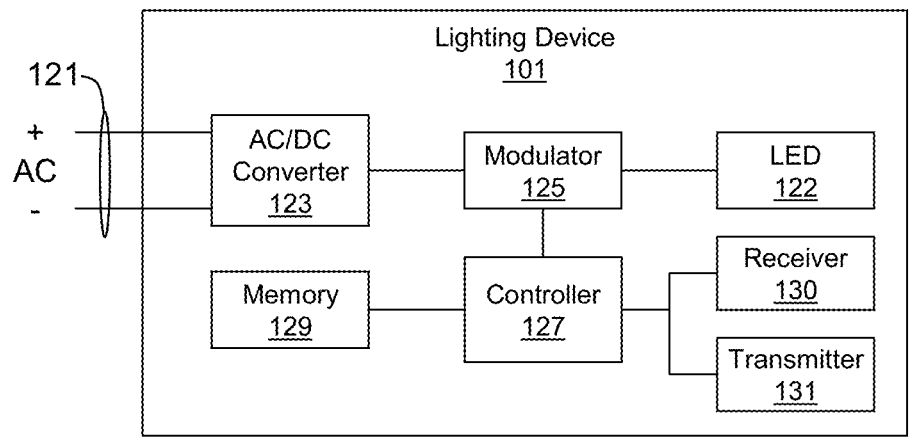
FIG. 5A illustrates a block diagram of an exemplary light source or lighting device.

FIG. 5A illustrates a block diagram of an exemplary lighting source or lighting device 101. The lighting device 101 may include an AC electrical connection 121 to connect to an external power source. In this example the lighting device 101 is an LED light source and, thus, includes the LED 122. The lighting device 101 may also include an AC/DC converter 123 to convert the AC to DC, a modulator 125 to switch the LED on and off as necessary to change, for example, intensity, color temperature, etc. The lighting device 101 may also include a controller 127 which controls operation of the lighting device 101 including control of the modulator 125.

The lighting device 101 may also include a memory 129 that stores commissioning information including, for example, a value for a lighting group assigned to the lighting device 101 and a stored light source identifier that uniquely identifies the lighting device 101. The lighting device 101 may also include a receiver 130 and a transmitter 131 that receive and transmit signals, respectively.

The transmitter 131 may transmit outgoing beacon signals. Each outgoing beacon signal may include a stored light source identifier that uniquely identifies the lighting device 101.

The receiver 130 may receive incoming beacon signals. The controller 127 may process the incoming beacon signals to determine whether they carry the light source identifier that identifies the lighting device 101. If, it does not, the processor may disregard the beacon signal. If an incoming beacon signal carries the light source identifier that identifies the lighting device 101, they controller 127 may change the value of the lighting group assigned to the lighting device 101. For example, the controller 127 may change the value of the lighting group assigned to the lighting device 101 in response to every subsequent instant in which the incoming light source identifier corresponds to the lighting device 101. In one embodiment, the controller 127 may increase the value of the lighting group assigned to the lighting device 101 one unit for every subsequent instant in which the incoming light source identifier corresponds to the lighting device 101.

In one embodiment, the controller 127 may cause the LED 122 to flash to indicate that the incoming light source identifier corresponds to the lighting device 101. In another embodiment, the controller 127 may cause the LED 122 to flash a number of times corresponding to the number in the lighting group currently assigned to the lighting device 101 (e.g., one blink=GROUP 1, two blinks=GROUP 2, etc.)

Although in FIG. 5A the controller 127 is shown as controlling both the lighting and communication functions of the lighting device 101, in some embodiments, the lighting device 101 may include two or more controllers that may be used to control these and other functions. For example, a first controller may be used to control lighting functions while a second controller may be used to control communications. The controller 127, receiver 130, and transmitter 131 may be implemented in any combination of hardware and software and may include a processor. The processor can be a variety of various processors including dual microprocessor and other multi-processor architectures.

The memory 129 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

Although in FIG. 5A the receiver 130 and transmitter 131 are shown as discrete from each other, in some embodiments, the receiver 130 and transmitter 131 may be implemented as one transceiver interface that allows the lighting device 101 to communicate. The receiver 130 and transmitter 131 may interact with local area networks (LAN), wide area networks (WAN), personal area networks (PAN) and other networks. The receiver 130 and transmitter 131 may interact with communication technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth® (IEEE 802.15.1), Zigbee® (IEEE 802.15.4), iBeacon®, Eddystone®, and the like.

Figure 5B:
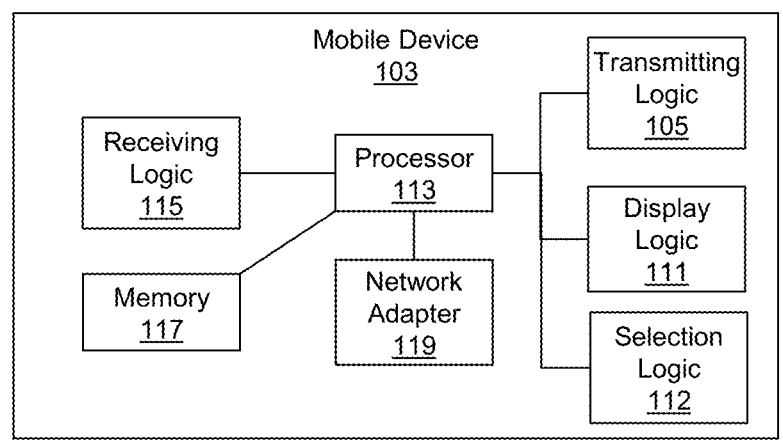
FIG. 5B illustrates a block diagram of an exemplary mobile device.

FIG. 5B illustrates a block diagram of an exemplary mobile device 103. The mobile device 103 may include a processor 113, memory 117, and a network adapter 119 to send and receive information. The mobile device 103 may also include a receiving logic 115 that works with the network adapter 119 to receive data from received beacon signals carrying respective light source identifiers that uniquely identify respective lighting devices 101. The mobile device 103 may also include a display logic 111 that displays a listing or mapping of lighting devices and a user selection logic 112 that detects user selection of the lighting device from the listing or mapping of lighting devices.

The mobile device 103 may also include a transmitting logic 105 that works with the network adapter 119 to transmit, as a result of the user selection, an incoming beacon signal carrying an incoming light source identifier corresponding to the light source identifier received. The user selection logic 112 may detect a subsequent user selection of the lighting device from the listing or mapping of lighting device and the transmitting logic 105 may transmit a subsequent incoming beacon signal carrying the incoming light source identifier to the selected lighting device to change the commissioning information of the selected lighting device including, for example, the value of its light group.

The receiving 115, transmitting 105, display 111, and selection 112 logics can be implemented in any combination of hardware and software. The logics can be stored in memory 117 and run by the processor 113. The logics can be part of an application that runs on the mobile device 103.

The processor 113 may be a generic CPU found in modern mobile devices. The CPU 113 processes received information and sends relevant information to the network adapter 119. Additionally, the CPU 113 reads and writes information to memory 117. The CPU 113 can use any standard computer architecture. Common architectures for microcontroller devices include ARM and x86.

The network adapter 119 is the networking interface that allows the mobile device 103, and the receiving logic 115 and the transmitting logic 105 to connect to cellular, Wi-Fi®, and other networks. The mobile device 103 may use the network adapter 119 to access commissioning information from remote sources (e.g., server 120). However, obtaining this information can be accomplished without a data connection by storing data locally to the mobile device's 103 memory 117. The network adapter 119, however, allows for greater flexibility and decreases the resources needed locally at the mobile device 103.

Although in FIG. 5B the receiving logic 115 and transmitting logic 105 are shown as discrete from each other, in some embodiments, they may be implemented as one transceiver interface that allow the mobile device 103 to communicate. The receiving logic 115 and transmitting logic 105 may interact via the network interface 119 with local area networks (LAN), wide area networks (WAN), personal area networks (PAN), cellular data networks (Edge, 3G, 4G, LTS, CDMA, GSM, LTE, etc.), and other networks. The receiver 130 and transmitter 131 may interact with communication technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth® (IEEE 802.15.1), Zigbee® (IEEE 802.15.4), iBeacon®, Eddystone®, and the like.

The mobile device 103 may also include a camera.

Figure 6:
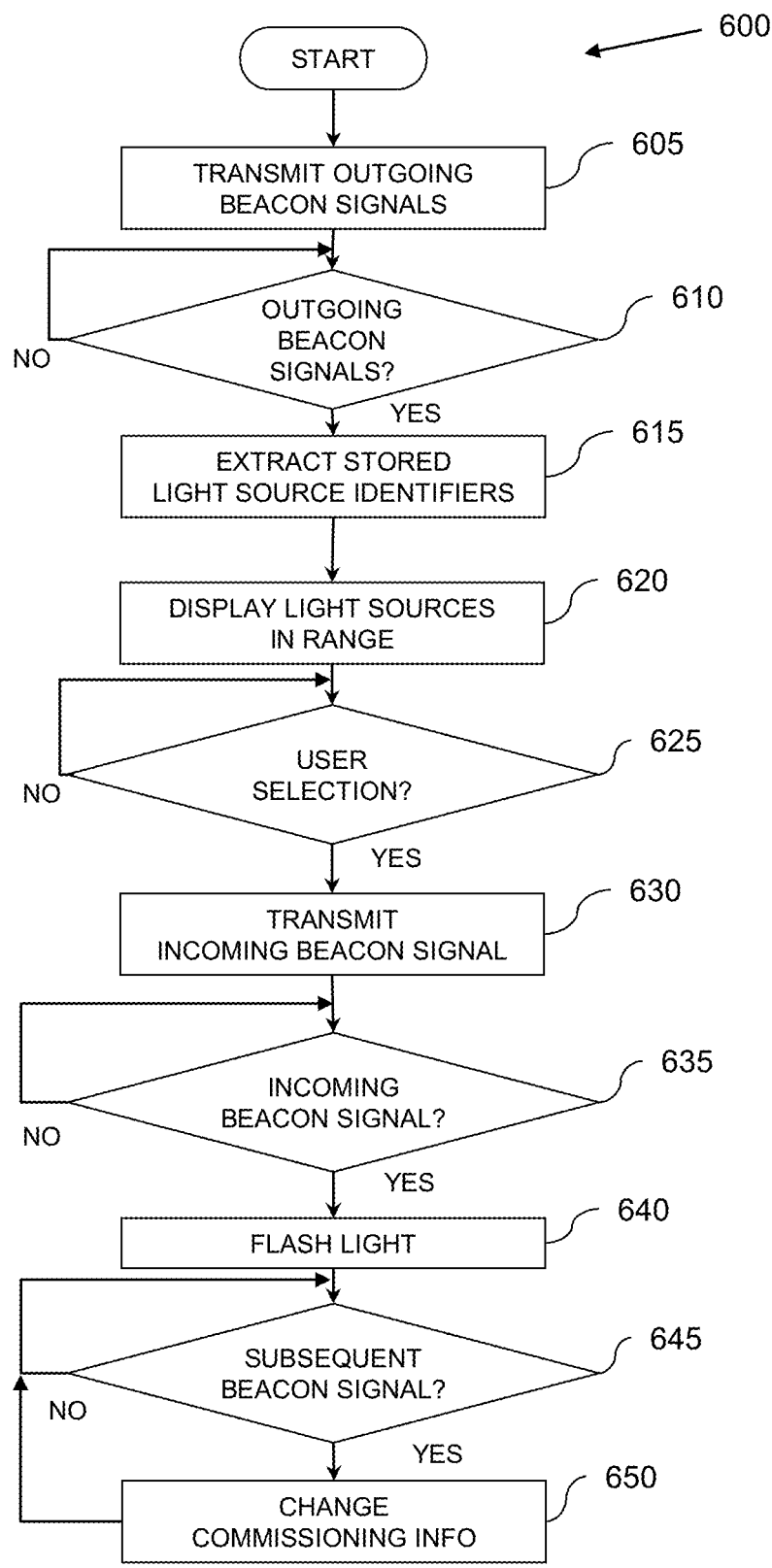
FIG. 6 illustrates a flow diagram for an exemplary method for commissioning of a light source.

Exemplary methods may be better appreciated with reference to the flow diagram of FIG. 6. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology.

Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 6 illustrates a flow diagram for an exemplary method 600 for commissioning of a light source. At 605, the method 600 includes the light source 101 transmitting outgoing beacon signals 107. Each outgoing beacon signal 107 may include a stored light source identifier that uniquely identifies the light source 101. At 610, the mobile device 103 receives the outgoing beacon signals from the light source 101 and other light sources within range. At 615, the mobile device 103 may extract the stored light source identifiers from the received outgoing beacon signals and, at 620, display a listing or mapping of light sources 101 whose outgoing corresponding beacon signals 107 are received at the mobile device 103.

The mobile device may then, at 625, detect user selection of the light source 101 from the listing or mapping of light sources. At 630, as a result of the detecting, the mobile device 103 transmits an incoming beacon signal 109 carrying an incoming light source identifier corresponding to the stored light source identifier received. At 635, the light source 101 receives the incoming beacon signal 109. At 640, the light source 101 may flash its light to give feedback to the user 102 of the selection. The mobile device 103 may detect a subsequent user selection on of the light source 101 from the listing or mapping of light sources and, as a result, the mobile device 103 may transmit a subsequent incoming beacon signal 109 carrying the incoming light source identifier. At 645, the light source 101 may receive the subsequent incoming beacon signal carrying the incoming light source identifier, and, in response, at 650, change commissioning information including a value for a lighting group assigned to the light source 101.

In one embodiment, the light source 101 may flash one or more of its light sources (e.g., LED) a number of times corresponding to the number in the lighting group currently assigned to the lighting device 101 (e.g., one blink=GROUP 1, two blinks=GROUP 2, etc.) The mobile device 103 may detect (using a camera of the mobile device 103) the number of flashes and record the number of flashes of the light source 101 as the value of the lighting group assigned to the light source 101.

In one embodiment, the mobile device 103 may record a number of user selections of the light source 101 from the listing or mapping of light sources as the value of the lighting group assigned to the light source 101. In another embodiment, the mobile device 103 may detect a user indication of the value of the lighting group assigned to the light source and record the user-indicated value as the value of the lighting group assigned to the light source.

Once commissioning is complete, the mobile device 103 may network with the light source 101 to secure it to prevent subsequent incoming beacon signals from changing the commissioning information.

While the figures illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

"Data store" or "database," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software-controlled microprocessor, discrete logic like an application specific integrated circuit (ASIC), a programmed logic device, a memory device containing instructions, or the like. Logic may include one or more gates, combinations of gates, or other circuit components.

Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal," as used herein, includes but is not limited to one or more electrical or optical signals, analog or digital signals, data, one or more computer or processor instructions, messages, a bit or bit stream, or other means that can be received, transmitted, or detected.

In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. An operable connection may be a direct connection or an indirect connection in which an intermediate entity or entities cooperate or otherwise are part of the connection or are in between the operably connected entities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A system for commissioning of a light source, comprising:
   a device or light source including:
   memory configured to store commissioning information including a value for a lighting group assigned to the light source and a stored light source identifier that uniquely identifies the light source;
   a processor operably connected to the memory; and
   a transmitter operably connected to the processor and configured to transmit outgoing beacon signals, each outgoing beacon signal including the stored light source identifier; and
   a mobile device application including:
   a receiving logic configured to receive data from received beacon signals carrying respective light source identifiers that uniquely identify respective light sources, the received beacon signals including the outgoing beacon signals carrying the stored light source identifier that uniquely identifies the light source;
   a display logic configured to display a listing or mapping of light sources;
   a user selection logic configured to detect user selection of the light source from the listing or mapping of light sources; and
   a transmitting logic configured to transmit, as a result of the user selection, an incoming beacon signal carrying an incoming light source identifier corresponding to the stored light source identifier received;
   the device or light source further including:
   a receiver configured to receive the incoming beacon signal carrying the incoming light source identifier;
   the user selection logic configured to detect a subsequent user selection of the light source from the listing or mapping of light sources;
   the transmitting logic configured to transmit a subsequent incoming beacon signal carrying the incoming light source identifier;
   the receiver configured to receive the subsequent incoming beacon signal carrying the incoming light source identifier; and
   the processor configured to update the commissioning information including the value for the lighting group assigned to the light source based on the received subsequent incoming beacon signal.

2. The system of claim 1, wherein, prior to the processor changing the commissioning information including the value of the lighting group assigned to the light source, the value of the lighting group assigned to the light source is a default value assigned to the light source prior to installation.

3. The system of claim 1, wherein the processor is configured to cause one or more light sources of the light source to flash to indicate that the incoming light source identifier corresponds to the stored light source identifier.

4. The system of claim 1, wherein the processor is configured to increase the value of the lighting group assigned to the light source one unit for every subsequent instant in which the incoming light source identifier corresponds to the stored light source identifier.

5. The system of claim 1, wherein the device or light source and the mobile device establish a dedicated connection, and, via the dedicated connection, the mobile device application disables the changing of the value of the lighting group based on later received incoming beacon signals.

6. A device for commissioning of a light source, comprising:
   memory configured to store commissioning information including a value for a lighting group assigned to the light source;
   a processor operably connected to the memory; and
   a receiver operably connected to the processor and configured to receive incoming beacon signals, the processor configured to change the value of the lighting group assigned to the light source based on the received incoming beacon signals.

7. The device of claim 6, wherein
the memory is configured to store a stored light source identifier that uniquely identifies the light source,
each of the received incoming beacon signals includes an incoming light source identifier, the processor is configured to change the value of the lighting group assigned to the light source in response to every subsequent instant in which the incoming light source identifier corresponds to the stored light source identifier.

8. The device of claim 7, wherein the processor is configured to increase the value of the lighting group assigned to the light source one unit for every subsequent instant in which the incoming light source identifier corresponds to the stored light source identifier.

9. The device of claim 6, comprising:
a transmitter operably connected to the processor and configured to transmit outgoing beacon signals, each outgoing beacon signal including a stored light source identifier that uniquely identifies the light source.

10. The device of claim 9, wherein the processor is configured to cause one or more light sources of the light source to flash to indicate that the incoming light source identifier corresponds to the stored light source identifier.

11. The device of claim 6, wherein, prior to the processor changing the value of the lighting group assigned to the light source, the value of the lighting group assigned to the light source is a default value assigned to the light source prior to installation.

12. The device of claim 6, wherein the processor is configured to establish a dedicated connection between the receiver and a remote transmitter and, via the dedicated connection, disable the changing of the value of the lighting group based on later received incoming beacon signals.

13. A computer-readable medium having stored therein an application for commissioning of a light source, the application comprising:
a communication logic configured to receive data from received beacon signals carrying respective light source identifiers that uniquely identify respective light sources, the received beacon signals including outgoing beacon signals carrying a stored light source identifier that uniquely identifies the light source;
a display logic configured to display a listing or mapping of the light sources; and
a user selection logic configured to detect user selection of the light source from the listing or mapping of the light sources;
the communication logic configured to transmit, as a result of the user selection, an incoming beacon signal carrying an incoming light source identifier corresponding to the stored light source identifier received;
the user selection logic configured to detect a subsequent user selection of the light source from the listing or mapping of light sources; and
the communication logic configured to transmit a subsequent incoming beacon signal carrying the incoming light source identifier to change commissioning information of the light source including a value of a lighting group assigned to the light source.

14. The computer-readable medium of claim 13, wherein the user selection logic is configured to:
record a number of user selections of the light source from the listing or mapping of light sources as the value of the lighting group assigned to the light source, or
detect a user indication of the value of the lighting group assigned to the light source and record the user indicated value as the value of the lighting group assigned to the light source.

15. The computer-readable medium of claim 13, wherein the communication logic is configured to establish a dedicated wireless connection, and via the dedicated wireless connection, transmit instructions to prevent subsequent incoming beacon signals from changing the commissioning information of the light source including the value of the lighting group assigned to the light source.

16. The computer-readable medium of claim 13, wherein the communication logic is configured to control a camera to detect a number of flashes of light by the light source and record the number of flashes as the value of the lighting group assigned to the light source.

* * * * *